(12) United States Patent
Yu (10) Patent No.: US 12,379,626 B2
(45) Date of Patent: Aug. 5, 2025

(54) DIRECT TYPE BACKLIGHT MODULE

(71) Applicant: AmTRAN TECHNOLOGY Co., Ltd., New Taipei (TW)

(72) Inventor: Hung-Ta Yu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 18/789,705

(22) Filed: Jul. 31, 2024

(65) Prior Publication Data

US 2025/0116899 A1 Apr. 10, 2025

(30) Foreign Application Priority Data

Oct. 6, 2023 (TW) ................. 112138527

(51) Int. Cl.
*G02F 1/13357* (2006.01)

(52) U.S. Cl.
CPC .. *G02F 1/133611* (2013.01); *G02F 1/133603* (2013.01); *G02F 1/133606* (2013.01)

(58) Field of Classification Search
CPC ......... G02F 1/133611; G02F 1/133603; G02F 1/133606; G02B 6/0061; G02B 6/0058; G02B 6/005; G02B 6/0045; G02B 6/0036; G02B 6/0035; G02B 6/00061
See application file for complete search history.

(56) References Cited

U.S. PATENT DOCUMENTS

| | | | |
|---|---|---|---|
| 2006/0139953 A1 | 6/2006 | Chou et al. | |
| 2008/0186273 A1 | 8/2008 | Krijn et al. | |
| 2019/0271882 A1* | 9/2019 | Chen ................. | G02F 1/133603 |
| 2022/0136675 A1* | 5/2022 | Chen ................. | G02F 1/133603 |
| | | | 362/97.1 |

(Continued)

FOREIGN PATENT DOCUMENTS

| | | | | |
|---|---|---|---|---|
| CN | 101122703 B | * 12/2010 | ........... | G02B 5/0231 |
| CN | 114967233 | 8/2022 | | |
| KR | 20210024340 | 3/2021 | | |

(Continued)

OTHER PUBLICATIONS

"Search Report of Europe Counterpart Application", issued on Apr. 28, 2025, p. 1-p. 10.

*Primary Examiner* — Erin Kryukova
(74) *Attorney, Agent, or Firm* — JCIPRNET (57) ABSTRACT

A backlight module includes a circuit board, light-emitting elements and a light guide component. The light emitting elements are disposed on the circuit board. The light emitting elements include a first light emitting element and a second light emitting element. The light emitting elements are disposed between the light-guiding element and the circuit board. There are no other optical elements between the light-guiding element and the light emitting elements. The light-guiding element has a light guiding portion, and the light guiding portion is composed of a light-transmitting material. The light guiding portion includes at least two first light guiding portions and a second light guiding portion.

(Continued)

The first light guiding portions are respectively disposed above the first light emitting element and the second light emitting element. The second light guiding portion is disposed between the first light guiding portions.

20 Claims, 10 Drawing Sheets

(56) References Cited

U.S. PATENT DOCUMENTS

2022/0206209 A1* 6/2022 Lee .................... G02F 1/133607
2023/0360611 A1* 11/2023 Chen ................. G02F 1/133606

FOREIGN PATENT DOCUMENTS

| TW | 200842405 | 11/2008 |
| TW | M624041 | 3/2022 |
| TW | 202238233 | 10/2022 |

* cited by examiner

DIRECT TYPE BACKLIGHT MODULE

CROSS-REFERENCE TO RELATED APPLICATION

This application claims the priority benefit of Taiwan application serial no. 112138527, filed on Oct. 6, 2023. The entirety of the above-mentioned patent application is hereby incorporated by reference herein and made a part of this specification.

BACKGROUND

Technical Field

The disclosure relates to a backlight module, and in particular, to a direct backlight module.

Description of Related Art

At present, the display screens of automobile dashboards and center consoles are trending towards high specifications such as large size, high brightness, high color saturation and high contrast, which are very different from the specifications of traditional in-car displays. The backlight modules used in these types of in-car display screens not only need to meet high-standard design requirements in terms of brightness, uniformity and viewing angle, but also need to be sufficiently thin. Therefore, the traditional direct-type LED backlight designs cannot meet the needs of in-car use, which do not provide sufficient light uniformity. For example, in the commonly used 25-point light uniformity test in the industry, the traditional direct-type light-emitting diode backlight modules can only reach 75% uniformity, which can only meet the needs of general displays. However, the light uniformity of automotive displays needs to reach above 85%. Therefore, how to improve the light uniformity of the backlight module to meet the specifications of automotive displays is actually a major challenge faced by developers.

SUMMARY

The disclosure provides a direct type backlight module with high light uniformity.

A direct type backlight module according to an embodiment of this disclosure includes a circuit board, light-emitting elements, a light guide component and at least one optical film. The light-emitting elements are disposed on the circuit board and are electrically connected to the circuit board. The light-emitting elements includes a first light-emitting element and a second light-emitting element. The light-emitting elements are disposed between the light guide component and the circuit board. There are no other optical elements between the light guide component and the light-emitting elements. The light guide component has a light guiding portion, the light guiding portion is composed of a non-light diffusing material, and the light guiding portion comprises at least two first light guiding portions and a second light guiding portion. The at least two first light guiding portions are respectively aligned to the first light-emitting element and the second light-emitting element. The second light guiding portion is located between the at least two first light guiding portions. The at least two first light guiding portions have a first thickness in a first direction. The second light guiding portion has a second thickness in the first direction. The first direction is substantially perpendicular to the circuit board. The second thickness is smaller than the first thickness. The light guide component is disposed between the at least one optical film and the light-emitting elements.

A direct type backlight module according to an embodiment of this disclosure includes a circuit board, light-emitting elements, a light guide component and at least one optical film. The light-emitting elements are disposed on the circuit board and electrically connected to the circuit board. The light-emitting elements comprise a first light-emitting element and a second light-emitting element. The light-emitting elements are disposed between the light guide component and the circuit board. There are no other optical elements between the light guide component and the light-emitting elements. The light guide component has a light guiding portion, and the light guiding portion is composed of a light-transmitting material. The light guiding portion comprises at least two first light guiding portions and a second light guiding portion. The first light guiding portions are respectively aligned to the first light-emitting element and the second light-emitting element. The second light guiding portion is located between the first light guiding portions. The light guide component is disposed between the at least one optical film and the light-emitting elements. The first light guiding portions have a first sub light incident surface and a first sub light output surface. The second light guiding portion has a second sub light incident surface and a second sub light output surface. The first sub light incident surface is substantially coplanar with the second sub light incident surface. The first sub light output surface is higher than the second sub light output surface in a first direction. The first direction is substantially perpendicular to the first sub light incident surface and the second sub light incident surface.

A direct type backlight module according to an embodiment of this disclosure includes a circuit board, a plurality of light-emitting elements, a light guide component and at least one optical film. The plurality of light-emitting elements are disposed on the circuit board and electrically connected to the circuit board. The light-emitting elements are disposed between the light guide component and the circuit board. There are no other optical elements between the light guide component and the light-emitting elements. The light guide component has a light guiding portion. The light guiding portion is composed of a light-transmitting material. The light guiding portion comprises at least two first light guiding portions and a second light guiding portion. The first light guiding portions have a first sub light incident surface and a first sub light output surface. The second light guiding portion is located between the at least two first light guiding portions. The second light guiding portion has a second sub light incident surface and a second sub light output surface. The first sub light incident surface is substantially coplanar with the second sub light incident surface. The first sub light output surface is higher than the second sub light output surface in a first direction, and the first direction is substantially perpendicular to the first sub light incident surface and the second sub light incident surface. The light guide component is disposed between the at least one optical film and the light-emitting elements.

Based on the above, the direct type backlight module of this disclosure uses the first light guiding portion and the second light guiding portion with different thicknesses (or the sub-light-emitting surfaces have height differences) to eliminate the difference between the light intensity on the first light guiding portion and the light intensity on the second light guiding portion provided by the light-emitting elements, so as to improve the light uniformity of the direct type backlight module.

DESCRIPTION OF THE EMBODIMENTS

Figure 1:
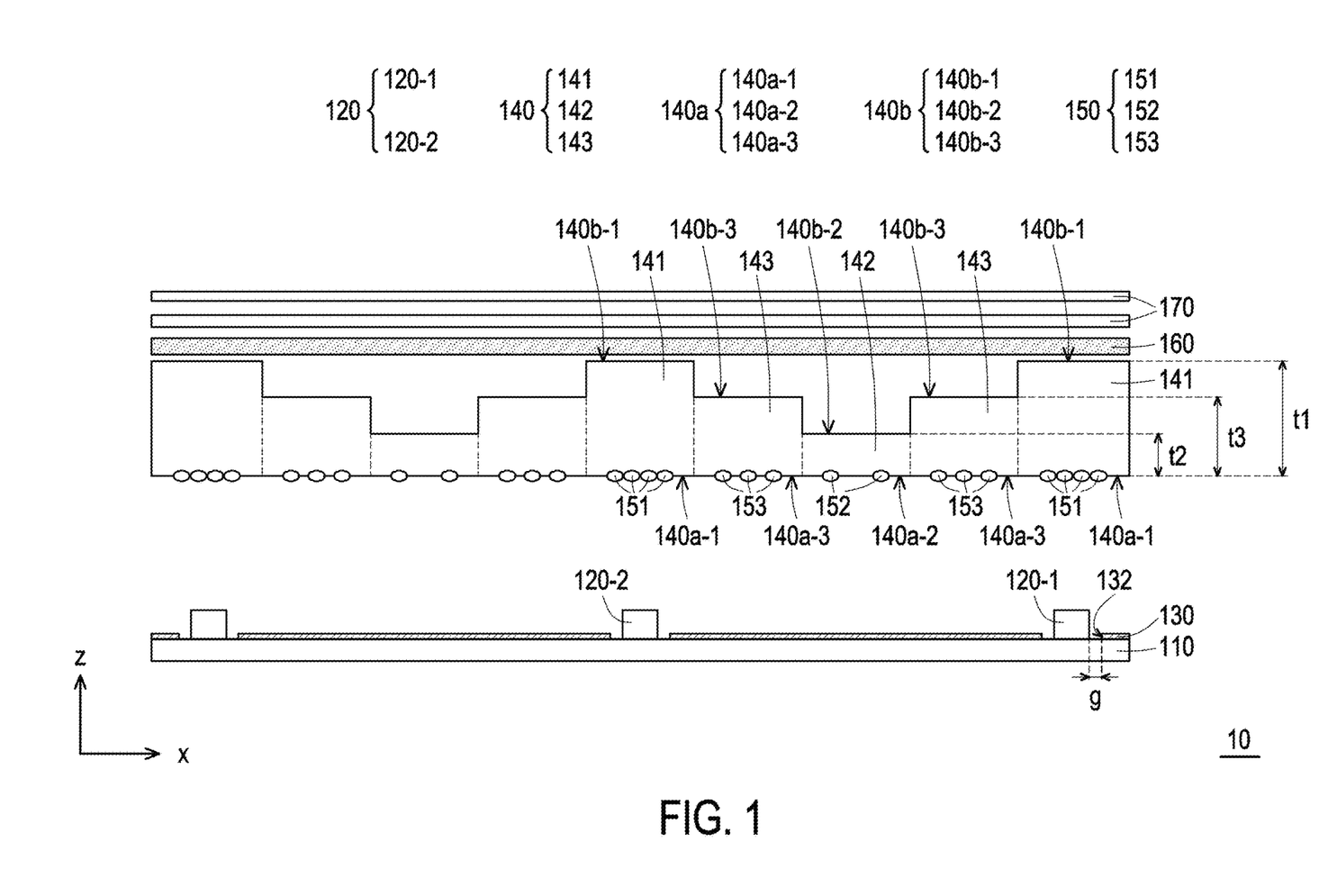
FIG. 1 is a schematic cross-sectional view of a backlight module according to an embodiment of this disclosure.

FIG. 1 is a schematic cross-sectional view of a backlight module according to an embodiment of this disclosure. Please refer to FIG. 1. The backlight module 10 is a direct type backlight module, which includes a circuit board 110 and light-emitting elements 120 disposed on the circuit board 110. The light-emitting elements 120 are electrically connected to the circuit board 110. The circuit board 110 is configured to drive the light-emitting elements 120. For example, in one embodiment, the circuit board 110 may be a printed circuit board (PCB), and the light-emitting elements 120 may be a sub-millimeter light-emitting diode (mini-LED), but this disclosure does not limit to thereto.

In one embodiment, the backlight module 10 may also selectively include a reflective sheet 130. The reflective sheet 130 covers the circuit board 110 and has multiple openings 132. The multiple openings 132 respectively expose light-emitting elements 120. The reflective sheet 130 is configured to reflect the light emitted by the light-emitting elements 120 to improve light utilization efficiency. In one embodiment, the reflectivity of the reflective sheet 130 can be above 95%, but this disclosure is not limited to thereto. In one embodiment, there may be a gap g between the light-emitting element 120 and an edge of the opening 132 of the reflective sheet 130. Preferably, the size of the gap g falls within the range of 0.5 mm to 2 mm, but this disclosure is not limited to thereto.

The backlight module 10 further includes a light guide component 140 and at least one optical film 170. Different from the traditional direct-type backlight module, the backlight module 10 of this disclosure replaces the traditional diffusion plate with the light guide component 140, and the light-emitting elements 120 are arranged between the light guide component 140 and the circuit board 110. There are no other optical elements between the light guide component 140 and the light-emitting elements 120. The light guide component 140 is positioned between at least one optical film 170 and the light-emitting elements 120. For example, in one embodiment, the optical films 170 may be selectively 2 optical films, and the optical films 170 may selectively include a brightness enhancement film and a diffuser film. However, this disclosure is not limited to thereto. In other embodiments, the number and/or types of the optical film 170 may be designed to other number and/or types according to actual needs.

The light-emitting elements 120 at least include a first light-emitting element 120-1 and a second light-emitting element 120-2. The main body of the light guide component 140 has light guiding portions, which may be made of polycarbonate (PC), polymethyl methacrylate (PMMA), styrene methyl methacrylate (SMMA or MS) or other optical grade materials with high light transmittance. The light guiding portions include at least two first light guiding portions 141 and a second light guiding portion 142. The at least two first light guiding portions 141 are respectively aligned to the first light-emitting element 120-1 and the second light-emitting element 120-2. The second light guiding portion 142 is located between the at least two first light guiding portions 141. In one embodiment, the light guiding portions of the light guide component 140 further includes at least two third light guiding portions 143, respectively located between the at least two first light guiding portions 141 and the second light guiding portion 142. The first direction z is substantially perpendicular to the circuit board 110. The first light guiding portion 141 has a first thickness t1 in the first direction z. The second light guiding portion 142 has a second thickness t2 in the first direction z. The third light guiding portion 143 has a third thickness t3 in the first direction z.

The light guide component 140 has a light incident surface 140a and a light output surface 140b. The light output surface 140b is disposed opposite the light incident surface 140a. The light incident surface 140a is located between the light output surface 140b and the light-emitting elements 120. The light incident surface 140a includes a first sub light incident surface 140a-1, a second sub light incident surface 140a-2 and a third sub light incident surface 140a-3, the first sub light incident surface 140a-1, the second sub light incident surface 140a-2 and the third sub light incident surface 140a-3 respectively belong to the first light guiding portion 141, the second light guiding portion 142 and the third light guiding portion 143. In one embodiment, the first sub light incident surface 140a-1, the second sub light incident surface 140a-2 and the third sub light incident surface 140a-3 may be substantially coplanar. The light output surface 140b of the light guide component 140 includes a first sub light output surface 140b-1, a second sub light output surface 140b-2 and a third sub light output surface 140b-3, the first sub light output surface 140b-1, the second sub light output surface 140b-2 and the third sub light output surfaces 140b-3 respectively belong to the first light guiding portion 141, the second light guiding portion 142 and the third light guiding portion 143. In one embodiment, the first sub light output surface 140b-1 is higher than the second sub light output surface 140b-2 in the first direction z, and the third sub light output surface 140b-3 is higher than the second sub light output surface 140b-2 in the first direction z and lower than the first sub light output surface 140b-1, wherein the first direction z is substantially perpendicular to the first sub light incident surface 140a-1 and the second sub light incident surface 140a-2.

It is worth noting that the thickness of each of light guiding portions of the light guide component 140 is designed correspondingly according to the light intensity distribution provided by the light-emitting elements 120 on the light incident surface 140a. At locations where high light intensity is received, the thickness of the light guide component 140 may be designed to be thicker to reduce the light transmittance. At locations where the received light intensity is low, the thickness of the light guide component 140 can be designed to be thinner to increase the light transmittance. Therefore, the sub light output surfaces have various heights. In this way, the overall light output uniformity of the backlight module 10 is improved. The following descriptions are provided with reference to FIG. 1 and FIG. 2.

Figure 2:
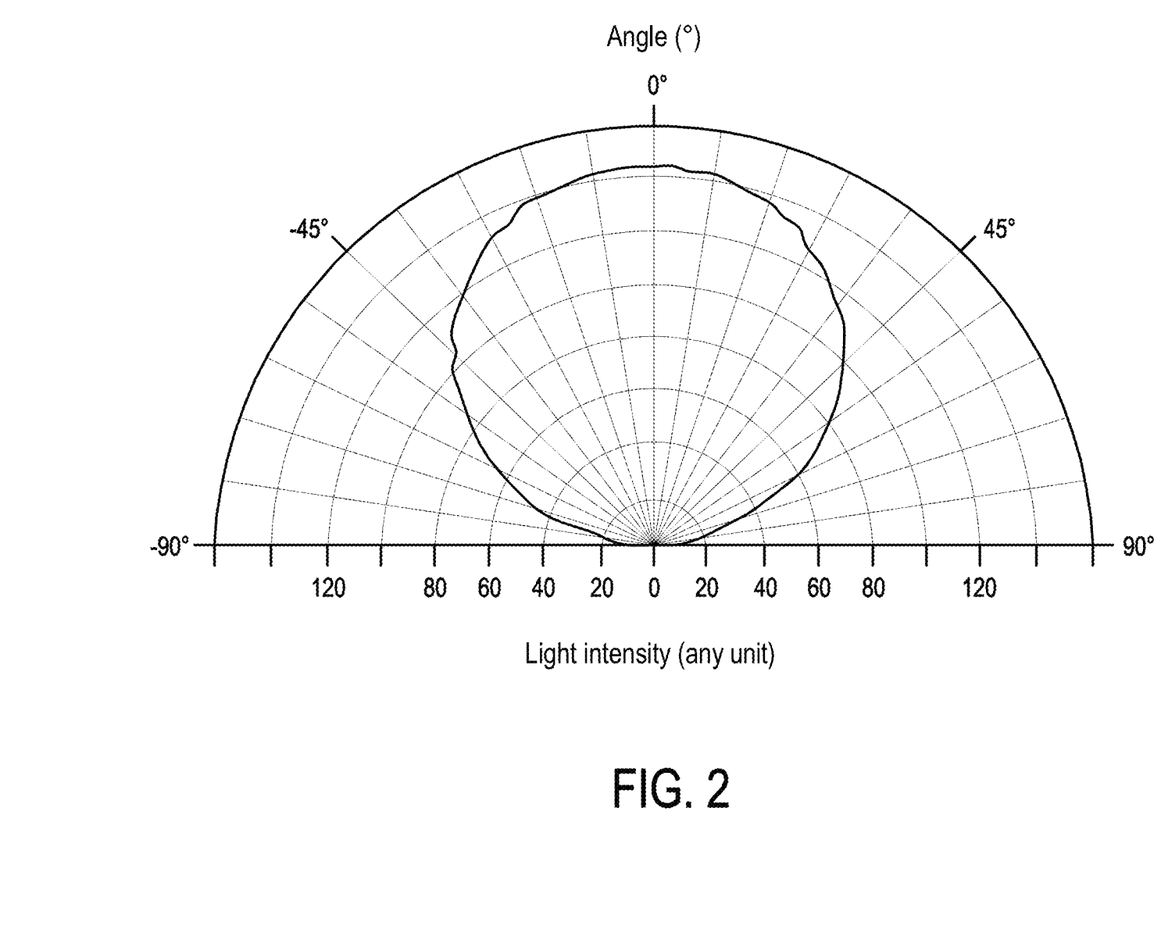
FIG. 2 is a schematic diagram of the light distribution of a light-emitting element of the backlight module of an embodiment of this disclosure.

FIG. 2 is a schematic diagram of the light distribution of a light-emitting element of the backlight module of an embodiment of this disclosure. Please refer to FIG. 1 and FIG. 2. In one embodiment, the light distribution of the light-emitting elements 120 may be a Gaussian distribution or a Lambertian distribution. When the light distribution of the light-emitting elements 120 is Gaussian or Lambertian, the light emission direction is relatively concentrated. Therefore, on the light incident surface 140a of the light guiding element 140, the light intensity received at a location is weaker when the location is farther from the locations directly above the light-emitting elements 120. Specifically, in one embodiment, the first sub light incident surfaces 140a-1 are located directly above the light-emitting elements 120 respectively, a second sub light incident surface 140a-2 is located on the periphery between two adjacent first sub light incident surfaces 140a-1, and the third sub light incident surfaces 140a-3 are located respectively between the first sub light incident surfaces 140a-1 and a second sub light incident surface 140a-2. The second sub light incident surfaces 140a-2 are located farther than the adjacent third sub light incident surface 140a-3 from the locations directly above any two adjacent light-emitting elements 120. The light intensity received on the second sub light incident surfaces 140a-2 is less than the light intensity received on the first sub light incident surfaces 140a-1, and the light intensity received on the third sub light incident surfaces 140a-3 is between the light intensity received on the first sub light incident surfaces 140a-1 and the second sub light incident surfaces 140a-2, thereby, the thickness t2 of the second light guiding portion 142 may be designed to be smaller than the thickness t1 of the first light guiding portion 141, and the third thickness t3 of the third light guiding portion 143 may be designed to be larger than the second thickness t2 and smaller than the first thickness t1. This is because the light transmitted to the first sub light incident surface 140a-1, the second sub light incident surface 140a-2 and the third sub light incident surface 140a-3 will respectively have high, low, and medium light intensities. With this design, the light with high light intensity passing through the thick first light guiding portion 141 will have a greater degree of energy loss, the light with low light intensity passing through the thin second light guiding portion 142 will have a smaller degree of energy loss, and the light with medium light intensity passing through the third light guiding portion 143 with a medium thickness will have a moderate degree of energy loss. Therefore, the difference in light intensities of the emitted light can be reduced during the transmission to the first sub light output surface 140b-1, the second sub light output surface 140b-2 and the third sub light output surface 140b-3 through the light guide component 140, thereby improving the light uniformity of the backlight module 10.

For example, in one embodiment, the thickness ratios among the various light guiding portions are: $40\% \leq (t2/t1) \leq 60\%$, and $70\% \leq (t3/t1) \leq 90\%$. However, this disclosure is not limited to thereto. In other embodiments, the ratio of the second thickness t2 of the second light guiding portion 142 to the first thickness t1 of the first light guiding portion 141 (t2/t1) and the ratio of the third thickness t3 of the third light guiding portion 143 to the first thickness t1 of the first light guiding portion 141 (t3/t1) can be appropriately designed depending on the change in the light distribution of the light-emitting elements 120.

Figure 3:
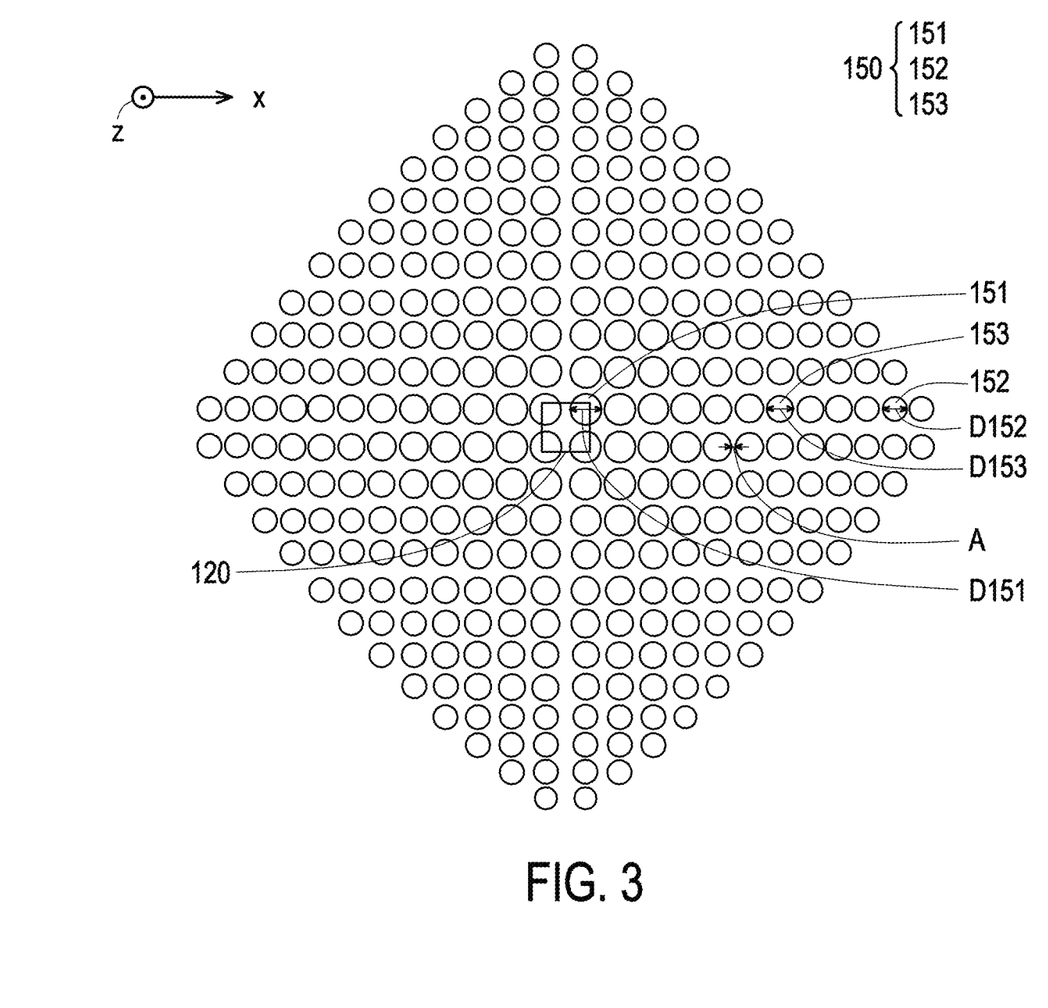
FIG. 3 is a schematic top view of the optical microstructure and light-emitting elements of the backlight module according to one embodiment of this disclosure.

FIG. 3 is a schematic top view of the optical microstructure and light-emitting elements of the backlight module according to one embodiment of this disclosure. It should be noted that optical microstructures 150 shown in FIG. 1 is used to schematically represent the arrangement density of the optical microstructures 150 at various locations. The sizes of the optical microstructures 150 shown in FIG. 1 are not necessarily representative of the relative sizes of the optical microstructures 150 located at various locations. Please refer to FIG. 3 for the relative sizes of the optical microstructures 150 located at various locations.

Please refer to FIG. 1 and FIG. 3. In one embodiment, the light incident surface 140a of the light guide component 140 may have optical microstructures 150. The optical microstructure 150 is configured to block and reflect the light emitted by the light-emitting elements 120. In one embodiment, the optical microstructures 150 are, for example, a plurality of micro-indentations. The depth of the micro-indentations is, for example, on the order of several micrometers (μm). The micro-indentations may be formed on the light incident surface 140a, for example, by a hot rolling process. However, this disclosure not limited to thereto.

It is worth mentioning that by adjusting the sizes of the optical microstructures 150 and/or the arrangement density of the optical microstructures 150 on the light incident surface 140a, hot spots of output light intensities can be effectively eliminated, and the light output uniformity of the backlight module 10 can be further improved.

For example, in one embodiment, the optical microstructures 150 may include first optical microstructures 151, second optical microstructures 152 and third optical microstructures 153. The first sub light incident surface 140a-1 of the first light guiding portion 141, the second sub light incident surface 140a-2 of the second light guiding portion 142 and the third sub light incident surface 140a-3 of the light guiding portion 143 may have first optical microstructures 151, second optical microstructures 152 and third optical microstructures 153 respectively. The second direction x is substantially parallel to circuit board 110, and the size D151 (as indicated in FIG. 3) of the first optical microstructure 151 in the second direction x is greater than the size D152 (as indicated in FIG. 3) of the second optical microstructure 152 in the second direction x, and the size D153 (as indicated in FIG. 3) of the third optical microstructure 153 in the second direction x is greater than the size D152 of the second optical microstructure 152 in the second direction x and smaller than the size D151 of the first optical microstructure 151 in the second direction x. In the other word, as the optical microstructure 150 at locations farther away from the locations directly above the light-emitting elements 120, the sizes of the optical microstructures 150 are gradually decreased. Specifically, in one embodiment, the size D152 of the second optical microstructure 152 and the size D153 of the third optical microstructure 153 can be reduced by 1% to 10% of the size D151 of the first optical microstructure 151 in comparison with the size D151 of the first optical microstructure 151. However, this disclosure is not limited to thereto. In other embodiments, the relative relationship among the size D151 of the first optical microstructure 151, the size D152 of the second optical microstructure 152 and the size D153 of the third optical microstructure 153 may have other appropriate designs corresponding to various light distributions of different light-emitting elements 120. Moreover, the height of the first optical microstructure 151, the height of the second optical microstructure 152 and the height of the third optical microstructure 153 can be changed as well as the horizontal sizes, or the optical microstructures 150 may only have different heights but have the same horizontal size. Both of such optical microstructures designs can also achieve the effect of improving light uniformity.

For example, in one embodiment, the first optical microstructures 151 have greater arrangement density than the second optical microstructures 152, and the third optical microstructures 153 have greater arrangement density than the second optical microstructures 152 and less arrangement density than the first optical microstructures 151. In the other word, the farther the optical microstructures 150 are from the locations directly above the light-emitting elements 120, the wider the spacing A between adjacent optical microstructures 150, or the smaller the sizes of the optical microstructures 150. However, this disclosure is not limited to thereto. In other embodiments, the relationship among the arrangement densities of the first optical microstructures 151, the second optical microstructures 152 and the third optical microstructures 153 can be appropriately designed with different height variations of the optical microstructures 150. In addition, other appropriate designs may be used corresponding to various light distributions of the light-emitting elements 120.

Please refer to FIG. 1. In one embodiment, the backlight module 10 may selectively include a diffuser film 160, which is disposed between at least one optical film 170 and the light guide component 140. The diffuser film 160 can scatter the light beam from the light output surface 140b of the light guide component 140, thereby further improving the light emitting uniformity of the backlight module 10.

It should be noted here that the following embodiments have some reference numbers and part of the contents from the above-mentioned embodiments, wherein the same reference numbers are used to indicate the same or similar elements, and descriptions of the same technical content are omitted. For descriptions of omitted parts, please refer to the above-mentioned embodiments and will not be repeated in the following embodiments.

Figure 4:
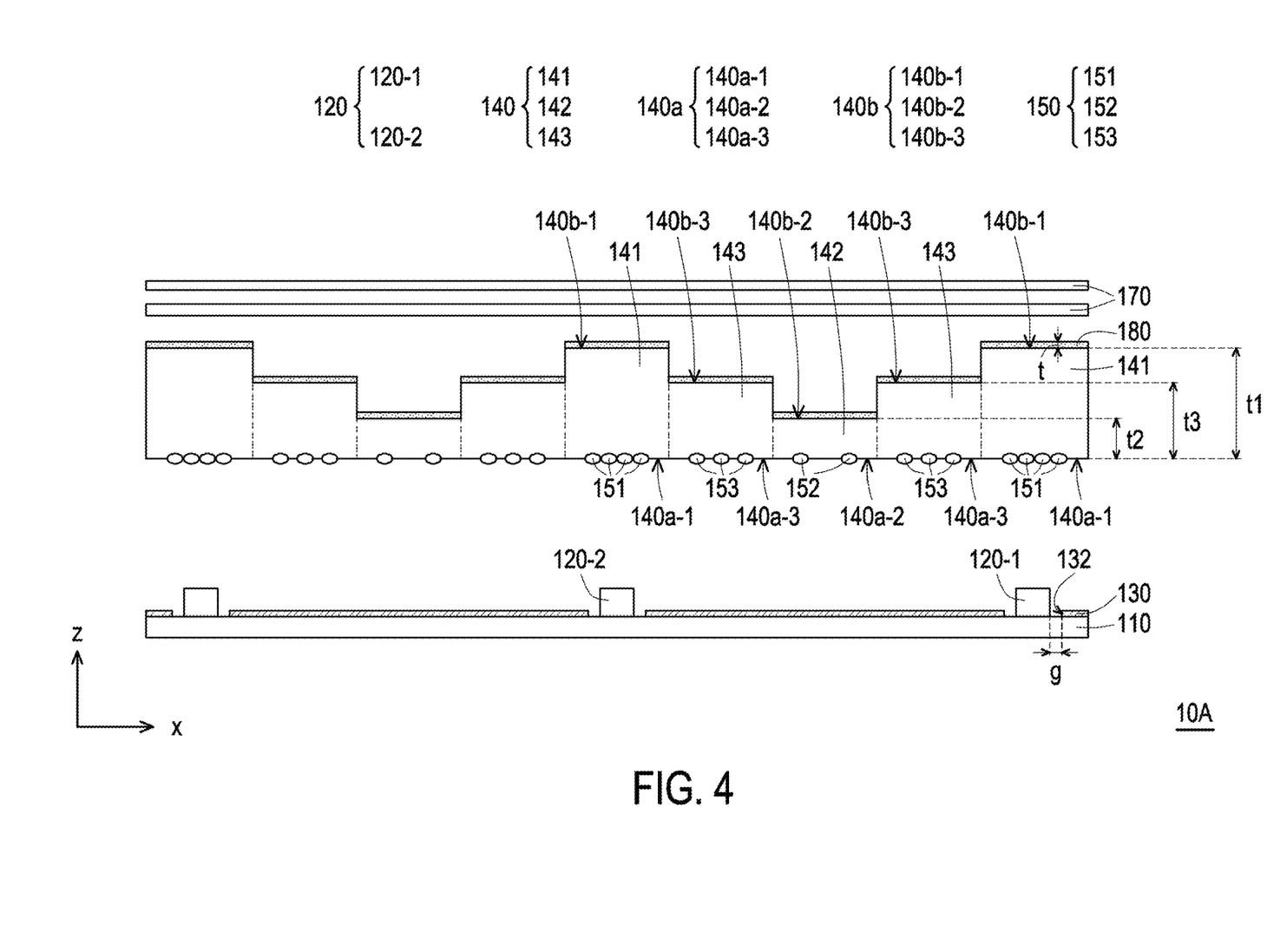
FIG. 4 is a schematic cross-sectional view of the backlight module of another embodiment of the disclosure.

FIG. 4 is a schematic cross-sectional view of the backlight module of another embodiment of the disclosure. The backlight module 10A of FIG. 4 is similar to the backlight module 10 of FIG. 1. The difference between the two backlight modules is that the backlight module 10A of FIG. 4 includes a diffusion layer 180 but does not include the diffuser film 160 of the backlight module 10 of FIG. 1.

Please refer to FIG. 4. In one embodiment, the upper part of the light guide component 140 has a diffusion layer 180, which is formed on the first sub light output surface 140b-1, the second sub light output surface 140b-2 and the third sub light output surface 140b-3 with height differences. The diffusion layer 180 includes diffusion particles (not shown) that can reflect or refract light beams to increase the number of light refractions within the light guide component 140. As the result, the transmission range of the light inside the light guide component 140 can be extended, thereby achieving good light mixing uniformity. For example, in one embodiment, the material of the diffusion particles may be polymethylmethacrylate (PMMA), polystyrene (PS) or titanium oxide ($TiO_2$), but this disclosure is not limit to thereto.

The diffusion layer 180 may be formed by coating with diffusion particle ink, and is applied to a required thickness t of the backlight module 10A in the first direction z. For example, in one embodiment, the thickness t may fall in the range of 1 μm to 100 μm, but this disclosure is not limited to thereto. Since the backlight module 10A of FIG. 4 uses the diffusion layer 180 disposed on the light output surface 140b to replace the diffuser film 160 of the backlight module 10 of FIG. 1, the backlight module 10A of FIG. 4 further has the advantage of being thinner than the backlight module 10 of FIG. 1.

Figure 5:
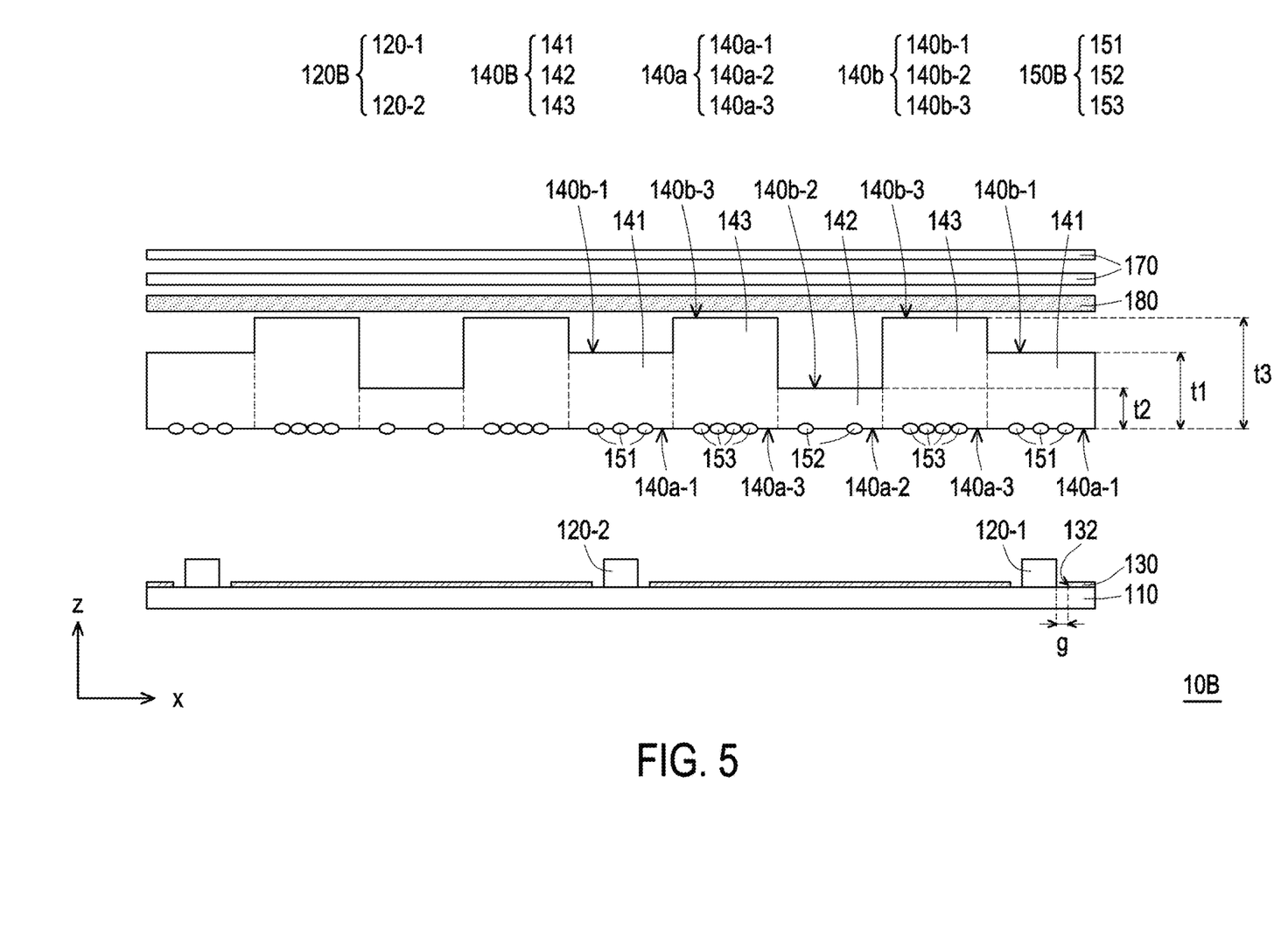
FIG. 5 is a schematic cross-sectional view of the backlight module of another embodiment of the disclosure.

FIG. 5 is a schematic cross-sectional view of the backlight module of another embodiment of the disclosure. The backlight module 10B of FIG. 5 is similar to the backlight module 10 of FIG. 1. The difference between the two backlight modules is that the light distribution of the light-emitting elements 120B of the backlight module 10B of FIG. 5 is different from the light distribution of the light-emitting elements 120 of the backlight module 10 of FIG. 1.

Figure 6:
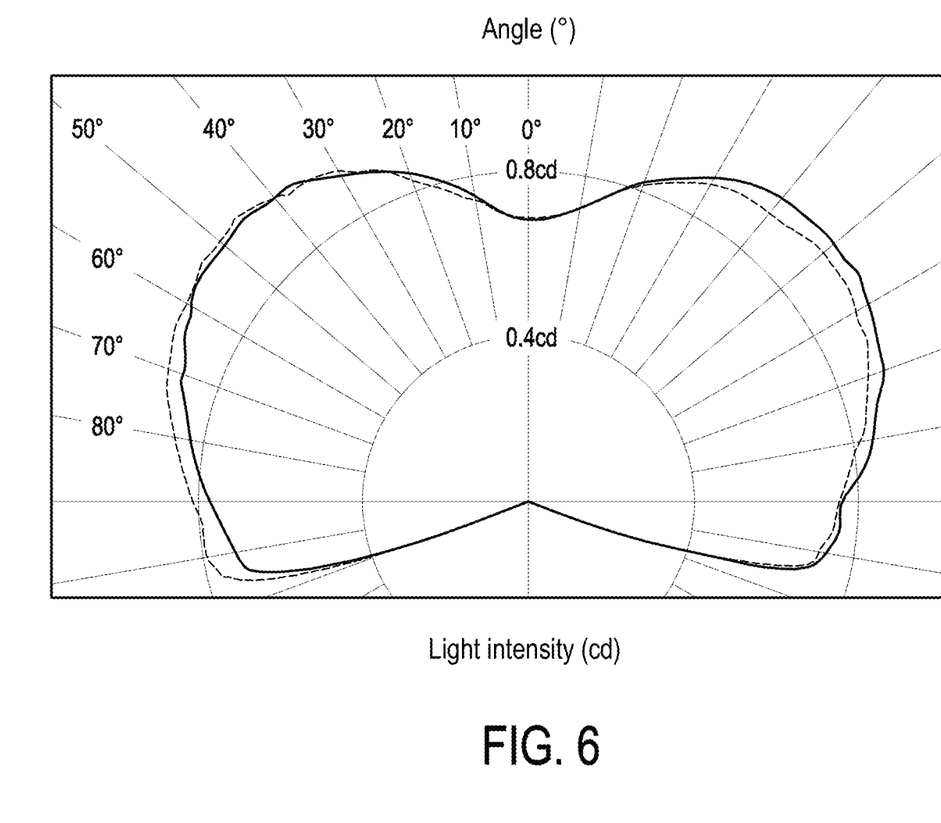
FIG. 6 is a schematic diagram of the light distribution of a light-emitting element of the backlight module of another embodiment of the present disclosure.

FIG. 6 is a schematic diagram of the light distribution of a light-emitting element of the backlight module of another embodiment of the present disclosure. Please refer to FIG. 5 and FIG. 6. The light distribution of the light-emitting elements 120B of the backlight module 10B is neither Gaussian nor Lambertian. According to the different light distribution of the light-emitting elements 120B, the thickness arrangement of the light guide component 140B in the backlight module 10B is different from the light guide component 140 of the above-mentioned embodiment. In addition, the relative sizes and relative arrangement density of the optical microstructures 150B on the light incident surface 140a in the backlight module 10B are also different from the above-mentioned embodiment.

Please refer to FIG. 5 and FIG. 6. Specifically, in one embodiment, the light distribution of the light-emitting elements 120B of the backlight module 10B may be a Batwing distribution. In the other word, in one embodiment, the light intensity on the third sub light incident surface 140a-3 is greater than the light intensity on the first sub light incident surface 140a-1, and the light intensity on the first sub light incident surface 140a-1 is greater than the light intensity on the second sub light incident surface 140a-2. According to the light intensity distributions provided by the above-mentioned light-emitting elements 120B on the first sub light incident surface 140a-1, the second sub light incident surface 140a-2 and the third sub light incident surface 140a-3, in one embodiment, the third light guiding portion 143, having the third sub light incident surface 140a-3, has the third thickness t3 greater than the first thickness t1 of the first light guiding portion 141, having the first sub light incident surface 140a-1, and the first light guiding portion 141, having the first sub light incident surface 140a-1, has the first thickness t1 greater than the second thickness t2 of the second light guiding portion 142, having the second sub light incident surface 140a-2. In this way, the light guide component 140B is designed to have thicker thickness at positions where the incident light intensities are higher, and thinner thickness at the positions where the incident light intensities are lower, so as to achieve uniform light output. For example, in one embodiment, $70\% \leq (t1/t3) \leq 90\%$, $40\% \leq (t2/t3) \leq 60\%$, but this disclosure is not limited to thereto.

Figure 7:
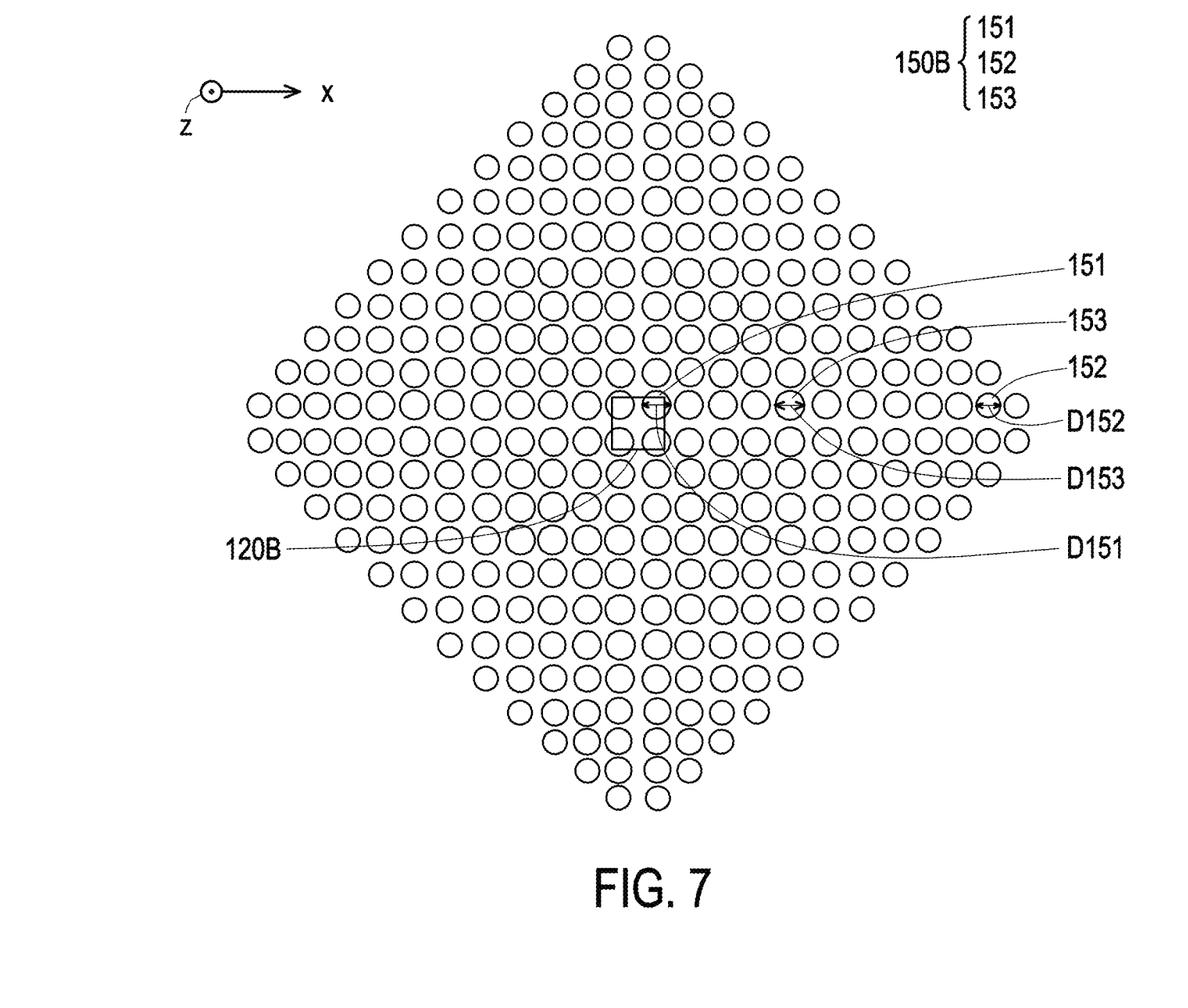
FIG. 7 is a schematic top view of the optical microstructure and light-emitting elements of the backlight module according to another embodiment of the present disclosure.

FIG. 7 is a schematic top view of the optical microstructures and light-emitting elements of the backlight module according to another embodiment of the present disclosure. It should be noted that the optical microstructures 150B shown in FIG. 5 are used to schematically represent the arrangement density of the optical microstructures 150B at various locations, and the sizes of the optical microstructures 150B shown in FIG. 5 does not necessarily represent the relative sizes of the optical microstructures 150B at various locations. The relative sizes of the optical microstructures 150B at various locations can be referred to in FIG. 7.

Please refer to FIG. 5, FIG. 6 and FIG. 7. According to the light distribution of the light-emitting elements 120B, in one embodiment, the size D153, in the second direction x, of the third optical microstructure 153 disposed on the third sub light incident surface 140a-3 is greater than the size D151 of the first optical microstructure 151 disposed on the first sub light incident surface 140a-1 in the second direction x, and the size D151 of the first optical microstructure 151 disposed on the first sub light incident surface 140a-1 in the second direction x is greater than the size D152 of the second optical microstructure 152 disposed on the second sub light incident surface 140a-2 in the second direction x. In one embodiment, the arrangement density of the third optical microstructures 153 disposed on the third sub light incident surface 140a-3 is greater than the first optical microstructures 151 disposed on the first sub light incident surface 140a-1, and the arrangement density of the first optical microstructures 151 on the first sub light incident surface 140a-1 is greater than the second optical microstructures 152 disposed on the second sub light incident surface 140a-2.

Figure 8:
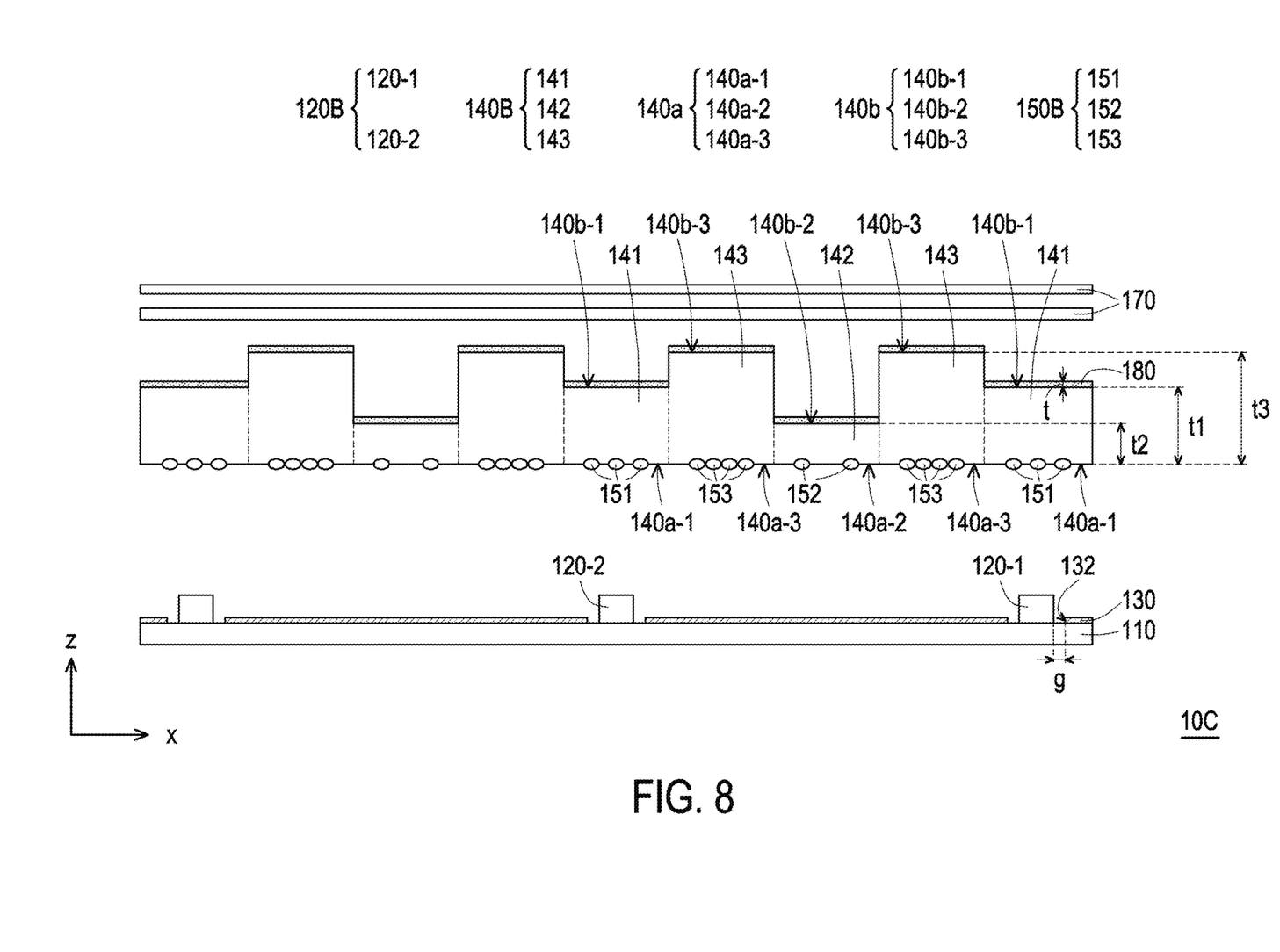
FIG. 8 is a schematic cross-sectional view of the backlight module of yet another embodiment of the disclosure.

FIG. 8 is a schematic cross-sectional view of the backlight module of yet another embodiment of the disclosure. The backlight module 10C of FIG. 8 is similar to the backlight module 10B of FIG. 5. The difference between the two backlight modules is that the backlight module 10C of FIG. 8 includes the diffusion layer 180 but does not include the diffuser film 160 of the backlight module 10B of FIG. 5.

Please refer to FIG. 8. In one embodiment, the backlight module 10C includes a diffusion layer 180, which is formed on the first sub light output surface 140b-1, the second sub light output surface 140b-2 and the third sub light output surface 140b-3 with height differences. The diffusion layer 180 may be used to replace the diffuser film 160 in the backlight module 10B of FIG. 5 to form the backlight module 10C of FIG. 8. Since the backlight module 10C of FIG. 8 uses the diffusion layer 180 disposed on the light output surface 140b, the backlight module 10C of FIG. 8 further has the advantage of being thinner than the backlight module 10B of FIG. 5.

Figure 9:
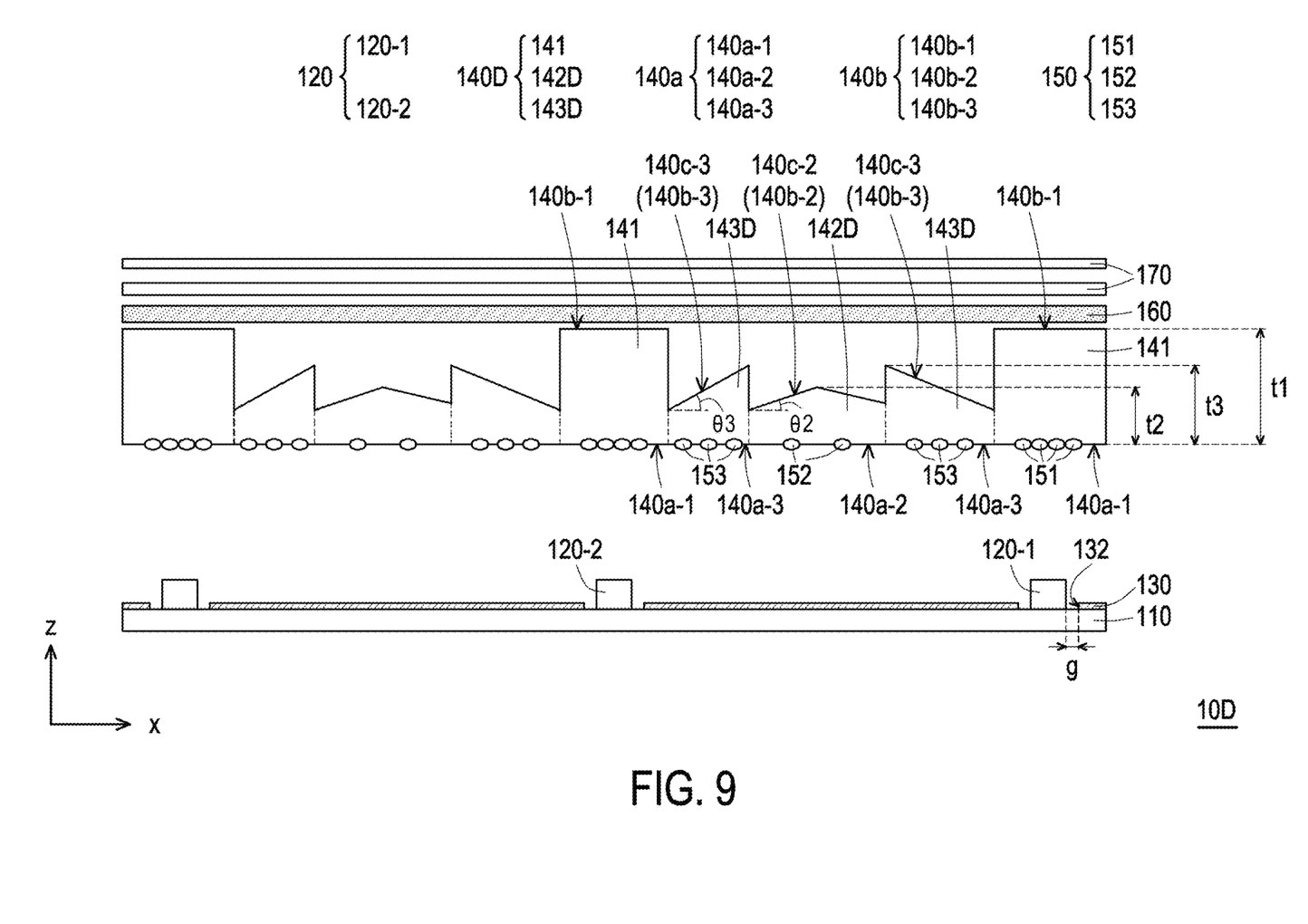
FIG. 9 is a schematic cross-sectional view of the backlight module of an embodiment of the present disclosure.

FIG. 9 is a schematic cross-sectional view of the backlight module of an embodiment of the present disclosure. The backlight module 10D of FIG. 9 is similar to the backlight module 10 of FIG. 1. The difference between the two backlight modules is that the light guide component 140D of the backlight module 10D of FIG. 9 is different from the light guide component 140 of the backlight module 10 of FIG. 1.

Please refer to FIG. 9. In one embodiment, the light guide component 140D can adopt a special-shaped light guide plate design having polygonal structures. Specifically, in one embodiment, at least one of the first sub light output surface 140b-1 of the first light guiding portion 141, the second sub light output surface 140b-2 of the second light guiding portion 142D, and the third sub light output surface 140b-3 of the third light guiding portion 143D may include at least one inclined sub surface 140c-2 or 140c-3, wherein at least one inclined sub surface 140c-2 or 140c-3 is inclined relative to the circuit board 110 at least one angle θ2 or θ3. The light intensity distribution on the light output surface 140b can be adjusted by at least one inclined sub surface 140c-2 or 140c-3 at the at least one angle θ2 or θ3 to the circuit board 110. In other words, by changing the at least one angle θ2 and θ3, different light intensity distribution effects can be achieved.

For example, in one embodiment, the second sub light output surface 140b-2 of the second light guiding portion 142D may include an inclined sub surface 140c-2, and the inclined sub surface 140c-2 is inclined at an angle θ2 relative to the circuit board 110. The third sub light output surface 140b-3 of the third light guiding portion 143D may include an inclined sub surface 140c-3, and the inclined sub surface 140c-3 is inclined at an angle θ3 relative to the circuit board 110, wherein θ3>θ2. However, this disclosure is not limited to thereto. In other embodiments, the relative inclination degrees of the inclined sub surfaces 140c-2 and 140c-3 can be designed differently depending on the desired light intensity distribution effect.

Figure 10:
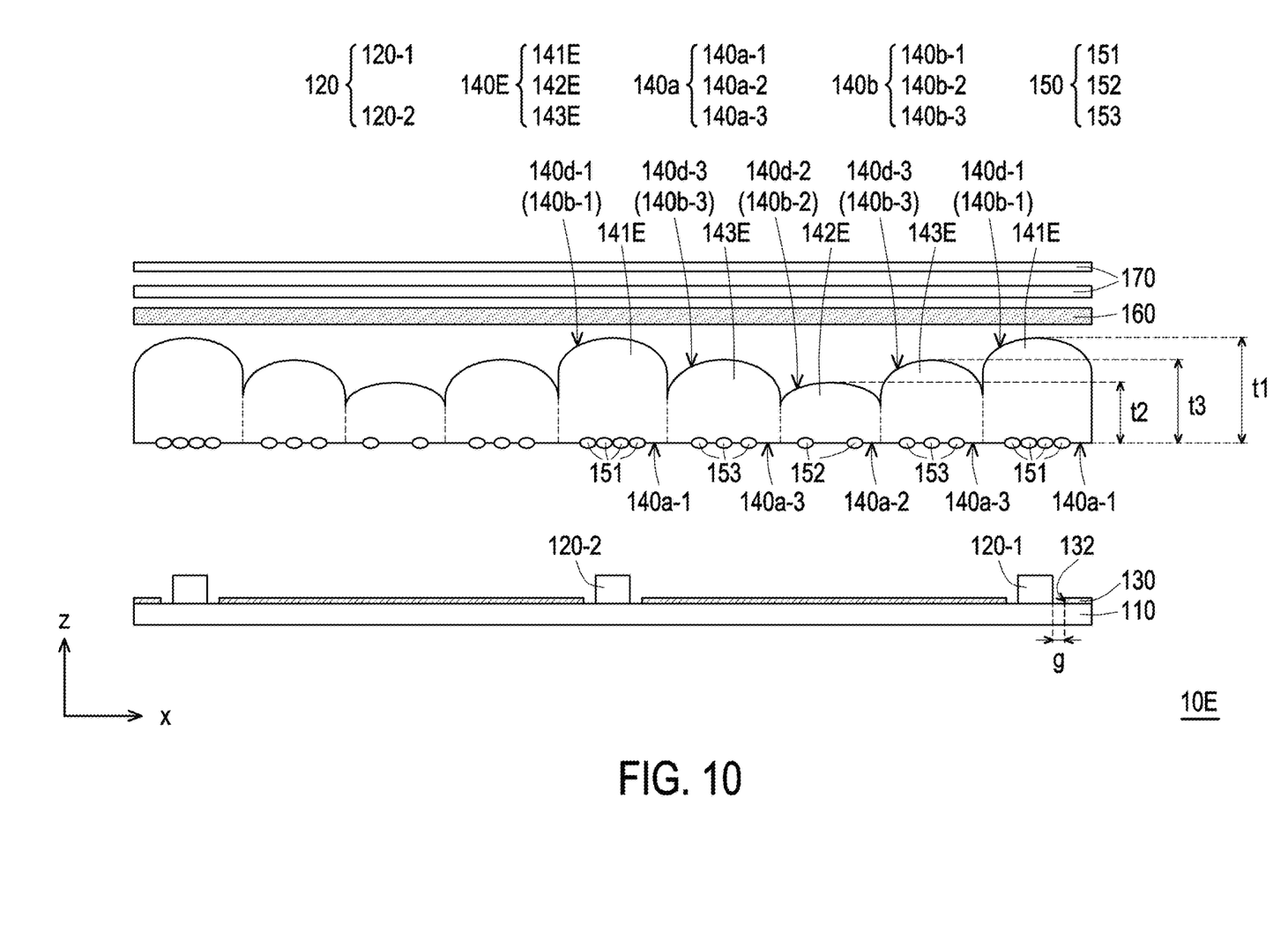
FIG. 10 is a schematic cross-sectional view of the backlight module of another embodiment of the disclosure.

FIG. 10 is a schematic cross-sectional view of the backlight module of another embodiment of the disclosure. The backlight module 10E of FIG. 10 is similar to the backlight module 10 of FIG. 1. The difference between the two backlight modules is that the light guide component 140E in the backlight module 10E of FIG. 10 is different from the light guide component 140 in the backlight module 10 of FIG. 1.

Please refer to FIG. 10. In one embodiment, the light guide component 140E can adopt a special-shaped light guide plate design having spherical structures. Specifically, in one embodiment, at least one of the first sub light output surface 140b-1 of the first light guiding portion 141E, the second sub light output surface 140b-2 of the second light guiding portion 142E, and the third sub light output surface 140b-of the third light guiding portion 143E may include at least one of the sub-convex surface 140d-1, 140d-2, or 140d-3. By changing the radius of curvature of at least one sub-convex surface 140d-1, 140d-2, or 140d-3, the light intensity distribution on the light output surface 140b can be controlled, thereby achieving different light intensity distribution effects.

For example, in one embodiment, the first sub light output surface 140b-1 of the first light guiding portion 141E, the second sub light output surface 140b-2 of the second light guiding portion 142E, and the third sub light output surface 140b-3 of the third light guiding portion 143E may respectively include sub-convex surface 140d-1, sub-convex surface 140d-2 and sub-convex surface 140d-3, wherein the radius of curvature of sub-convex surface 140d-2 may be greater than the radius of curvature of sub-convex surface 140d-1, and the radius of curvature of sub-convex surface 140d-3 may be between the radius of curvature of sub-convex surface 140d-2 and the radius of curvature of sub-convex surface 140d-1. However, this disclosure is not limited to thereto. In other embodiments, the relative radius of curvatures of the sub-convex surfaces 140d-1, 140d-2, and 140d-3 may be designed differently depending on the desired light intensity distribution effect. In addition, in some embodiments, the light guide component 140D of FIG.9 and the light guide component 140E of FIG.10 may include the diffusion layer 180, and the backlight module 10D and the backlight module 10E do not include the diffuser film 160 to achieve a thinner design.

It should be noted that in FIGS. 1, 4, 5, 8, 9 and 10, the illustrated first optical microstructure 151, the second optical microstructure 152 and the third optical microstructure 153 are only schematic diagrams representing differences in the arrangement density, and do not depict the specific quantities, sizes and positions of the first optical microstructure 151, the second optical microstructure 152 and the third optical microstructure 153 on the first sub light incident surface 140a-1, the second sub light incident surface 140a-2 and the third sub light incident surface 140a-3. As mentioned above, the sizes, the arrangement densities and the heights of the first optical microstructures 151, the second optical microstructures 152 and the third optical microstructures 153 can be changed to achieve the effect of improving light uniformity with various light sources.

In summary, the backlight module of an embodiment of this disclosure includes light-emitting elements, a light guide component and at least one optical film. The light guide component is disposed between the at least one optical film and the light-emitting elements. The light guide component includes first light guiding portions aligned to the light-emitting elements and second light guiding portions away from the light-emitting elements. In particular, the thickness of the first light guiding portions and the thickness of the second light guiding portions are designed differently according to the light distribution of the light-emitting elements, and optical microstructures are arranged on the light incident surfaces corresponding to the light distribution. In this way, the light output uniformity of the backlight module can be improved to more than 85% in the 25-point light output uniformity test. In addition, compared with the traditional direct type backlight modules, which require a space of about 1 cm height for the traditional diffuser plates and optical films, the backlight module of the present invention replaces the diffuser plate with a microstructure light guide component. Under the condition of using the same quantity of light-emitting elements 120, the height of the optical cavity within the backlight module of this disclosure can be reduced to 2.5 cm, and the thickness of the optical film only needs 2.5 cm, which can better meet the requirements of thin display devices.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A direct type backlight module comprising:
a circuit board;
a plurality of light-emitting elements, disposed on the circuit board and electrically connected to the circuit board, wherein the light-emitting elements comprise a first light-emitting element and a second light-emitting element;
a light guide component, wherein the light-emitting elements are disposed between the light guide component and the circuit board, there are no other optical elements between the light guide component and the light-emitting elements, the light guide component has a light guiding portion, the light guiding portion is composed of a non-light diffusing material, the light guide component and the light-emitting elements are separated by a distance, and the light guiding portion comprises:
first light guiding portions, wherein the first light guiding portions are respectively aligned to the first light-emitting element and the second light-emitting element; and
a second light guiding portion, wherein the second light guiding portion is located between the first light guiding portions, the first light guiding portions have a first thickness in a first direction, and the second light guiding portion has a second thickness in the first direction, the first direction is substantially perpendicular to the circuit board, the second thickness is smaller than the first thickness, and the second light guiding portion is not aligned to the light-emitting elements; and
at least one optical film, wherein the light guide component is disposed between the at least one optical film and the light-emitting elements.

2. The direct type backlight module according to claim 1, wherein the light guide component further comprises:
third light guiding portions respectively located between the first light guiding portions and the second light guiding portion, wherein the third light guiding portion has a third thickness in the first direction, and the third thickness is greater than the second thickness.

3. The direct type backlight module according to claim 1, wherein the first light guiding portions have a first sub light incident surface, and the first sub light incident surface has a first optical microstructure;
wherein the second light guiding portion has a second sub light incident surface, and the second sub light incident surface has a second optical microstructure;
wherein a size of the first optical microstructure in a second direction is larger than a size of the second optical microstructure in the second direction, and the second direction is substantially parallel to the circuit board.

4. The direct type backlight module according to claim 3, wherein the light guide component further comprises:
third light guiding portions respectively located between the first light guiding portions and the second light guiding portion, wherein the third light guiding portions have a third sub light incident surface, the third sub light incident surface has a third optical microstructure, and a size of the third optical microstructure in the second direction is larger than the size of the second optical microstructure in the second direction.

5. The direct type backlight module according to claim 1, wherein the first light guiding portions have a first sub light incident surface, and the first sub light incident surface has first optical microstructures;
wherein the second light guiding portion has a second sub light incident surface, and the second sub light incident surface has second optical microstructures;
wherein the first optical microstructures are arranged more closely than the second optical microstructures.

6. The direct type backlight module according to claim 5, wherein the light guide component further comprises:
third light guiding portions respectively located between the first light guiding portions and the second light guiding portion, wherein the third light guiding portions have a third sub light incident surface, and the third sub light incident surface has third optical microstructures, and the third optical microstructures are arranged more closely than the second optical microstructures.

7. The direct type backlight module according to claim 1, further comprising:

a diffuser, disposed between the at least one optical film and the light guide component.

8. The direct type backlight module according to claim 1, wherein the first light guiding portions respectively have a first sub light output surface, the second light guiding portion has a second sub light output surface, and the light guiding portion further comprises:
a diffusion layer formed on the first sub light output surface and the second sub light output surface.

9. The direct type backlight module according to claim 8, wherein the light guide component further comprises:
third light guiding portions respectively located between the first light guiding portions and the second light guiding portion, wherein the third light guiding portions respectively have a third sub light output surface, and the diffusion layer is further formed on the third sub light output surface.

10. A direct type backlight module comprising:
a circuit board;
a plurality of light-emitting elements, disposed on the circuit board and electrically connected to the circuit board, wherein the light-emitting elements comprise a first light-emitting element and a second light-emitting element;
a light guide component, wherein the light-emitting elements are disposed between the light guide component and the circuit board, there are no other optical elements between the light guide component and the light-emitting elements, the light guide component has a light guiding portion, the light guiding portion is composed of a light-transmitting material, the light guide component and the light-emitting elements are separated by a distance, and the light guiding portion comprises:
first light guiding portions, wherein the first light guiding portions are respectively aligned to the first light-emitting element and the second light-emitting element; and
a second light guiding portion, wherein the second light guiding portion is located between the first light guiding portions; and
at least one optical film, wherein the light guide component is disposed between the at least one optical film and the light-emitting elements;
wherein the first light guiding portions have a first sub light incident surface and a first sub light output surface, the second light guiding portion has a second sub light incident surface and a second sub light output surface, the first sub light incident surface is substantially coplanar with the second sub light incident surface, the first sub light output surface is higher than the second sub light output surface in a first direction, the first direction is substantially perpendicular to the first sub light incident surface and the second sub light incident surface, and the second light guiding portion is not aligned to the light-emitting elements.

11. The direct type backlight module according to claim 10, wherein the light guide component further comprises:
third light guiding portions respectively located between the first light guiding portions and the second light guiding portion, wherein the third light guiding portions have a third sub light incident surface and a third sub light output surface respectively, the third sub light incident surface is substantially coplanar with the first sub light incident surface and the second sub light incident surface, the third sub light output surface is higher than the second sub light output surface in the first direction.

12. The direct type backlight module according to claim 10, wherein the first sub light incident surface has a first optical microstructure, and the second sub light incident surface has a second optical microstructure;
wherein a size of the first optical microstructure in a second direction is larger than a size of the second optical microstructure in the second direction, and the second direction is substantially parallel to the circuit board.

13. The direct type backlight module according to claim 10, wherein the first sub light incident surface has first optical microstructures, and the second sub light incident surface has second optical microstructures;
wherein the first optical microstructures are arranged more closely than the second optical microstructures.

14. The direct type backlight module according to claim 10, further comprising:
a diffuser, disposed between the at least one optical film and the light guide component.

15. The direct type backlight module according to claim 10, wherein the light guiding portion further comprises:
a diffusion layer formed on the first sub light output surface and the second sub light output surface.

16. A direct type backlight module comprising:
a circuit board;
a plurality of light-emitting elements, disposed on the circuit board and electrically connected to the circuit board;
a light guide component, wherein the light-emitting elements are disposed between the light guide component and the circuit board, there are no other optical elements between the light guide component and the light-emitting elements, the light guide component has a light guiding portion, the light guiding portion is composed of a light-transmitting material, the light guide component and the light-emitting elements are separated by a distance, and the light guiding portion comprises:
first light guiding portions, wherein the first light guiding portions have a first sub light incident surface and a first sub light output surface; and
a second light guiding portion, wherein the second light guiding portion is located between the first light guiding portions, the second light guiding portion has a second sub light incident surface and a second sub light output surface, the first sub light incident surface is substantially coplanar with the second sub light incident surface, the first sub light output surface is higher than the second sub light output surface in a first direction, the first direction is substantially perpendicular to the first sub light incident surface and the second sub light incident surface, and the second sub light incident surface and the light-emitting elements do not overlap in the first direction; and
at least one optical film, wherein the light guide component is disposed between the at least one optical film and the light-emitting elements.

17. The direct type backlight module according to claim 16, wherein the light guide component further comprises:
third light guiding portions respectively located between the first light guiding portions and the second light guiding portion, wherein the third light guiding portions have a third sub light incident surface and a third sub light output surface respectively, the third sub light incident surface is substantially coplanar with the first sub light incident surface and the second sub light incident surface, the third sub light output surface is higher than the second sub light output surface in the first direction.

18. The direct type backlight module according to claim 16, wherein the first sub light incident surface has a first optical microstructure, and the second sub light incident surface has a second optical microstructure;

wherein a size of the first optical microstructure in a second direction is larger than a size of the second optical microstructure in the second direction, and the second direction is substantially parallel to the circuit board.

19. The direct type backlight module according to claim 16, wherein the first sub light incident surface has first optical microstructures, and the second sub light incident surface has second optical microstructures;

wherein the first optical microstructures are arranged more closely than the second optical microstructures.

20. The direct type backlight module according to claim 16, wherein the plurality of light-emitting elements comprise a first light-emitting element and a second light-emitting element, and the first light guiding portions are respectively aligned to the first light-emitting element and the second light-emitting element.

* * * * *